(12) United States Patent
Murphy, Jr. et al.

(10) Patent No.: US 7,793,469 B2
(45) Date of Patent: Sep. 14, 2010

(54) SANITARY COVE BASE

(76) Inventors: William R. Murphy, Jr., 9833 Shoreline Dr., Longmont, CO (US) 80504; James L. Wood, 14587 Madison St., Brighton, CO (US) 80602

(*) Notice: Subject to any disclaimer, the term of this patent is extended or adjusted under 35 U.S.C. 154(b) by 1299 days.

(21) Appl. No.: 10/821,752

(22) Filed: Apr. 8, 2004

(65) Prior Publication Data

US 2005/0055936 A1 Mar. 17, 2005

Related U.S. Application Data

(60) Provisional application No. 60/496,250, filed on Aug. 18, 2003.

(51) Int. Cl.
*E04B 5/02* (2006.01)

(52) U.S. Cl. .................... 52/177; 52/579; 52/716.8; 52/483.1

(58) Field of Classification Search .............. 52/244, 52/245, 312, 311.2, 287.1, 783.1, 263, 275, 52/277, 336, 716.1, 716.8, 731.1, 731.3, 52/177, 732.2, 220.5, 218, 579, 483.1; 405/218
See application file for complete search history.

(56) References Cited

U.S. PATENT DOCUMENTS

| | | | |
|---|---|---|---|
| 3,196,763 A * | 7/1965 | Rushton | 404/21 |
| 3,335,429 A * | 8/1967 | Arp | 52/716.2 |
| 3,959,830 A * | 6/1976 | van den Broek | 52/287.1 |
| 4,266,381 A * | 5/1981 | Deller | 52/177 |
| 4,642,957 A | 2/1987 | Edwards | |
| 4,713,920 A | 12/1987 | Oginz | |
| 5,357,053 A | 10/1994 | Manaras | |
| 5,613,339 A * | 3/1997 | Pollock | 52/731.1 |
| 5,651,224 A | 7/1997 | Brabant | |
| 5,894,701 A | 4/1999 | Delorme | |
| 5,916,101 A * | 6/1999 | Stibolt | 52/254 |
| 5,979,132 A | 11/1999 | Margarit | |
| 6,060,144 A * | 5/2000 | Kimura et al. | 428/91 |
| 6,189,276 B1 | 2/2001 | Pinto et al. | |
| 6,202,380 B1 | 3/2001 | Trutwin et al. | |
| 6,324,796 B1 * | 12/2001 | Heath | 52/177 |
| 6,357,189 B2 | 3/2002 | Schlisner | |
| 6,457,287 B1 * | 10/2002 | Wilcox | 52/217 |
| 6,504,098 B2 | 1/2003 | Seamans | |
| 6,516,576 B1 | 2/2003 | Balmer | |
| 6,584,743 B2 | 7/2003 | Paxton et al. | |
| 6,594,961 B2 * | 7/2003 | Leines | 52/177 |
| 6,637,163 B2 * | 10/2003 | Thibault et al. | 52/177 |
| 6,739,106 B2 * | 5/2004 | Curatolo | 52/592.1 |
| D492,797 S * | 7/2004 | Simko et al. | D25/125 |
| 7,047,697 B1 * | 5/2006 | Heath | 52/177 |

* cited by examiner

*Primary Examiner*—Richard E Chilcot, Jr.
*Assistant Examiner*—Chi Q Nguyen
(74) *Attorney, Agent, or Firm*—Heimbecher & Assoc., LLC

(57) ABSTRACT

A sanitary cove base including an outer wall and an inner wall that are separated from each other by a plurality of longitudinally-extending web members creating a plurality of hollow channels between the inner wall and outer wall is disclosed. Each of the hollow channels is separated from the next adjacent hollow channel by one of the web members.

35 Claims, 11 Drawing Sheets

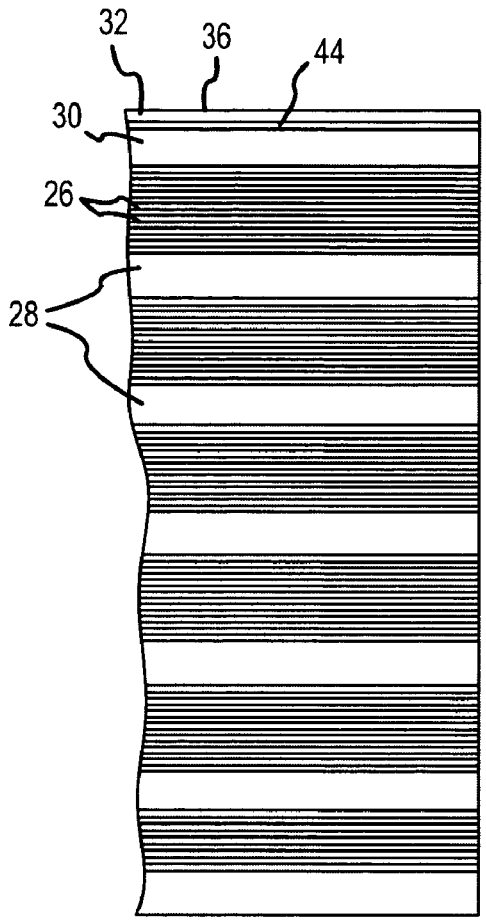
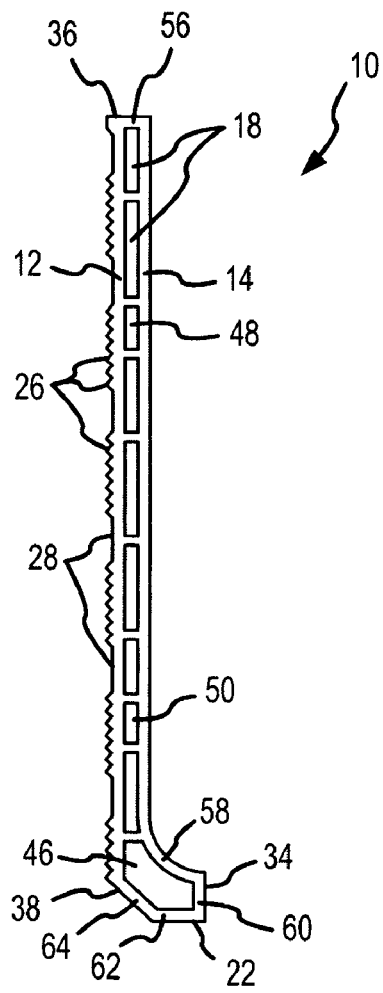
FIG.3  FIG.4
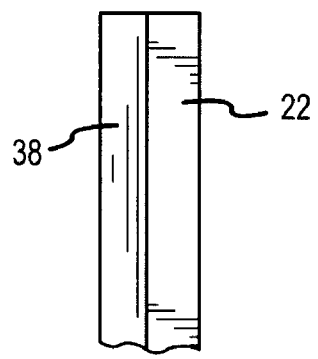
FIG.5

SANITARY COVE BASE

CROSS-REFERENCE TO RELATED APPLICATIONS

This application claims priority to U.S. Provisional Application No. 60/496,250, filed 18 Aug. 2003 (the '250 application). The '250 application is hereby incorporated by reference as though fully set forth herein

BACKGROUND OF THE INVENTION a. Field of the Invention

The instant invention is directed toward a sanitary cove base. More specifically, it relates to a sanitary cove base that may be installed in relatively hostile environments where controlling, for example, impact damage, mold, and rotting is highly desirable.

b. Background Art

It is well known to use cove base or baseboard to decoratively finish a room where the walls meet the floor. In some environments, the cove base not only serves a decorative or aesthetic function, but also helps prevent damage to the walls. For example, in a bakery or meat processing room, the cove base may serve at least a couple of different purposes beyond mere aesthetics. First, since large carts or palate jacks may be used to transfer items in these types of facilities, the cove base may eliminate or reduce wall damage from food carts or pallet jacks that are inadvertently or intentionally pushed towards a wall since the lower portion of the cart or jack will impact the cove base instead of directly impacting the wall. Second, when cove base is properly installed and caulking compound or grout has been appropriately applied, the cove base can help keep moisture from saturating the lower portion of the walls when, for example, mopping the floor or scrubbing the walls.

In the past, clay tiles (e.g., six-inch tall clay tiles) have been adhered to walls to form baseboards in bakeries, meat processing rooms, and other food storage and handling rooms. Once the clay tiles are installed, the junctures or gaps between the clay tiles adhered to the wall and, for example, the clay tiles adhere to the subfloor are filled with grout or a caulking compound. Similarly, the juncture between the upper edge of the clay tiles and the wall is grouted or filled with a caulking compound. Since a common clay tile used for this purpose is six inches wide, a large number of joints exist along the baseboard. This large number of joints creates an opportunity for moisture to get behind or under the tiles, particularly as the installation ages. Also, when food carts or palate jacks impact the clay tiles, the tiles themselves may become cracked or the joints between adjacent tiles may lose their integrity. Commonly, within a month or two after installation of a clay tile baseboard, water starts to get behind or under the clay tiles, which eventually results in formation of mold that causes the disintegration of the wall and subfloor, and which can contaminate food being processed or stored in the facility. If a facility becomes infested with mold, the facility may need to be shut down and evacuated until the mold is contained and removed, leading to lost revenue for the facility.

Thus, there remains a need for an improved cove base that provides better impact resistance, that may be used when remodeling existing facilities, and/or that reduces the opportunity for formation of mold.

BRIEF SUMMARY OF THE INVENTION

It is an object of the disclosed invention to provide an improved sanitary cove base. In one form, the sanitary cove base comprises an outer wall and an inner wall that are separated from each other by a plurality of longitudinally-extending web members creating a plurality of hollow channels between the inner wall and outer wall. Each of the hollow channels is separated from the next adjacent hollow channel by one of the web members. In one embodiment of the present invention, the sanitary cove base is made with the following composition: 98% polyethylene plastic, 1% coloring agent, ½% foaming agent, and ½% anti-fungal material.

In one form, the invention comprises a sanitary cove base having an outer wall; an inner wall; a plurality of longitudinally-extending web members existing between the outer wall and the inner wall, thereby connecting the outer wall to the inner wall; and a plurality of hollow channels, each hollow channel being defined between the inner wall, the outer wall, a first longitudinally-extending web member of the plurality of longitudinally-extending web members, and a next adjacent longitudinally-extending web member of the plurality of longitudinally-extending web members.

In another form, the present invention comprises a molded corner that may be used in combination with a sanitary cove base having a plurality of longitudinally-extending hollow channels. The molded corner comprises a plurality of integrated alignment tabs and a main body portion that has a first edge and a second edge. The plurality of integrated alignment tabs includes a first integrated alignment tab that extends from the first edge of the main body portion, and a second integrated alignment tab that extends from the second edge of the main body portion. Each of the integrated alignment tabs is adapted to extend into one of the longitudinally-extending hollow channels in the sanitary cove base.

In yet another form, the present invention comprises a molded corner that may be used in combination with a sanitary cove base having a plurality of longitudinally-extending hollow channels. The molded corner comprises a main body portion, wherein the main body portion has a first edge and a second edge, wherein the first edge comprises at least a first slot, and wherein the second edge comprises at least a second slot. The molded corner also comprises a first removable alignment strip, wherein the first removable alignment strip has a first longitudinal end and a second longitudinal end, and wherein the first longitudinal end of the first removable alignment strip is frictionally engaged in the first slot along the first edge of the main body portion. The molded corner also comprises a second removable alignment strip, wherein the second removable alignment strip has a first longitudinal end and a second longitudinal end, and wherein the first longitudinal end of the second removable alignment strip is frictionally engaged in the second slot along the second edge of the main body portion. The second longitudinal ends of the first and second removable alignment strips are adapted to extend into one of the longitudinally-extending hollow channels in the sanitary cove base.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 3 is a fragmentary view of the wall-facing surface of the sanitary cove base depicted in FIGS. 1 and 2.

FIG. 4 depicts the longitudinal end of the sanitary cove base depicted in FIGS. 1-3.

FIG. 5 is a fragmentary view of the bottom surface and chamfer of the sanitary cove base depicted in FIGS. 1-4.

DESCRIPTION OF THE PREFERRED EMBODIMENTS

The present invention comprises a sanitary cove base 10 that may be installed during new construction or may be retrofit into older buildings. The sanitary cove base 10 includes a number of features described further below that enhance its ability to resist damage from impact and damage resulting from, for example, mold. The sanitary cove base achieves these beneficial characteristics through special structural properties and through the material from which it is manufactured. In one embodiment of the present invention, the sanitary cove base is made with the following composition to help control mold and mildew: 98% high-density polyethylene plastic, 1% coloring agent (any color may be used), ½% foaming agent, and ½% anti-fungal material. The sanitary cove base could be constructed from a wide variety of other materials. For example, the sanitary cove base could be made from ABS, polypropylene, high-density polyethylene, or PVC.

Figure 1:
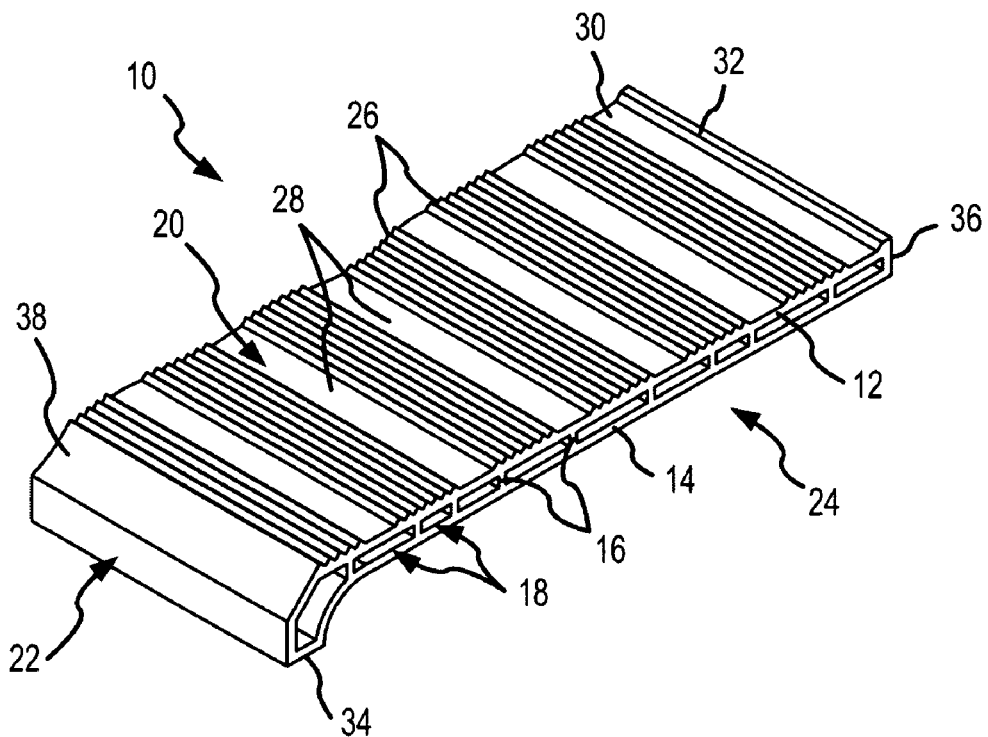
FIG. 1 is a fragmentary, isometric view of the wall-facing surface, bottom surface, and a longitudinal end of a sanitary cove base according to one embodiment of the present invention.

FIGS. 1-6 depict a first embodiment of the sanitary cove base 10 according to the present invention. The sanitary cove base comprises an outer wall 12 and an inner wall 14 that are separated from each other by a plurality of longitudinally-extending web members 16 creating a plurality of hollow channels 18 between the inner wall 14 and outer wall 12. Each of the hollow channels is separated from the next adjacent hollow channel by one of the web members. FIG. 1 is a fragmentary, isometric view of sanitary cove base 10 and depicts the wall-facing surface 20, the bottom surface 22, and a longitudinal end 24 of the sanitary cove base. The wall-facing surface comprises sections of adhesive ridges 26 separated by relief valleys 28. In particular, in the embodiment depicted in FIG. 1, there are six sections of adhesive ridges, and each section of adhesive ridges is separated from the next adjacent section of adhesive ridges by a relief valley. The adhesive ridges provide a roughened area for better adhesive bonding. The relief valleys can, among other things, accommodate excessive adhesive that may have been applied to the wall-facing surface 20 during installation of the sanitary cove base 10.

As also shown in FIG. 1, the upper relief valley 30 separates the upper section of adhesive ridges from a wall-contact crest 32. As explained further below in connection with FIG. 18, the wall-contact crest extends rearwardly from the outer wall 12 of the sanitary cove base 10 approximately the same distance that the adhesive ridges 26 extend rearwardly from the wall-facing surface 20. The sanitary cove base also includes a flooring material abutment surface 34, a top surface 36, and a bottom surface 22, which is separated from the wall-facing surface 20 by a chamfer 38.

Figure 2:
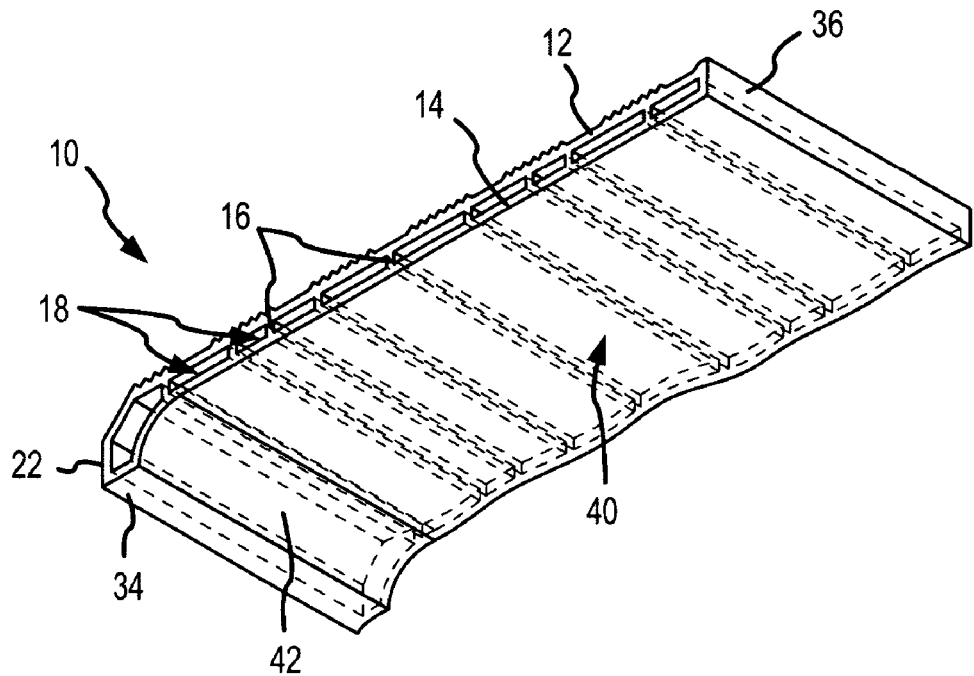
FIG. 2 is a fragmentary, isometric view of the sanitary cove base depicted in FIG. 1 showing its interior surface, its top surface, and a longitudinal end.

FIG. 2 depicts the sanitary cove base 10 of FIG. 1 in a different orientation. In FIG. 2, the interior surface 40 of the inner wall 14 is clearly visible, as is the top surface 36 and a sanitary sweep 42. As shown to good advantage in FIG. 2, the hollow channels 18 in this embodiment extend longitudinally through the sanitary cove base 10.

FIG. 3 depicts the wall-facing surface 30, including the adhesive ridges 26, relief valleys 28, and wall-contact crest 32. As shown in this figure, the top sidewall 44 of the upper relief valley 30 connects the wall-contact crest 32 to the floor of the upper relief valley. FIG. 5 depicts the bottom surface 22 and chamfer 38 of the sanitary cove base 10.

Figure 6:
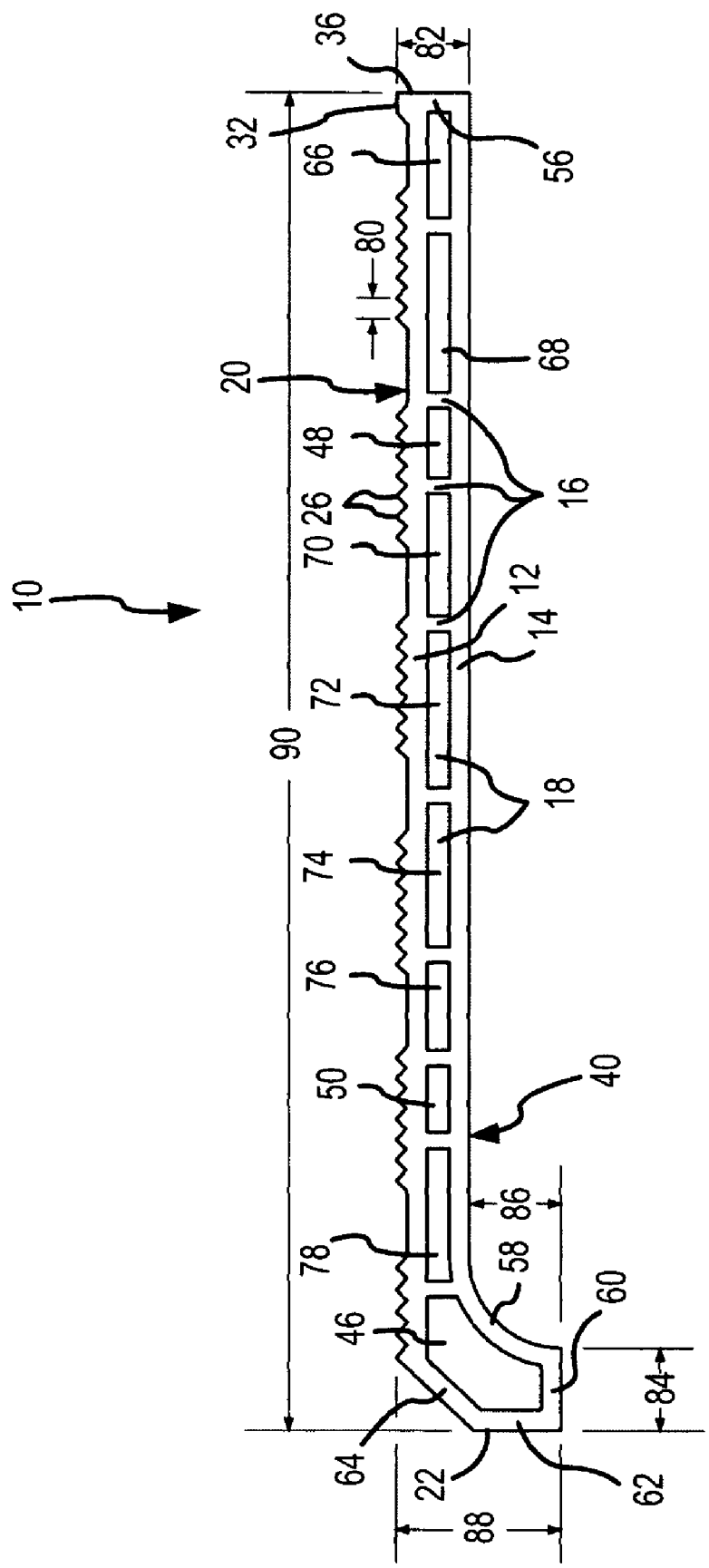
FIG. 6 is similar to FIG. 4, but has been enlarged to show further details and to show dimension information for an embodiment of the sanitary cove base like the one depicted in FIGS. 1-5.
Figure 18:
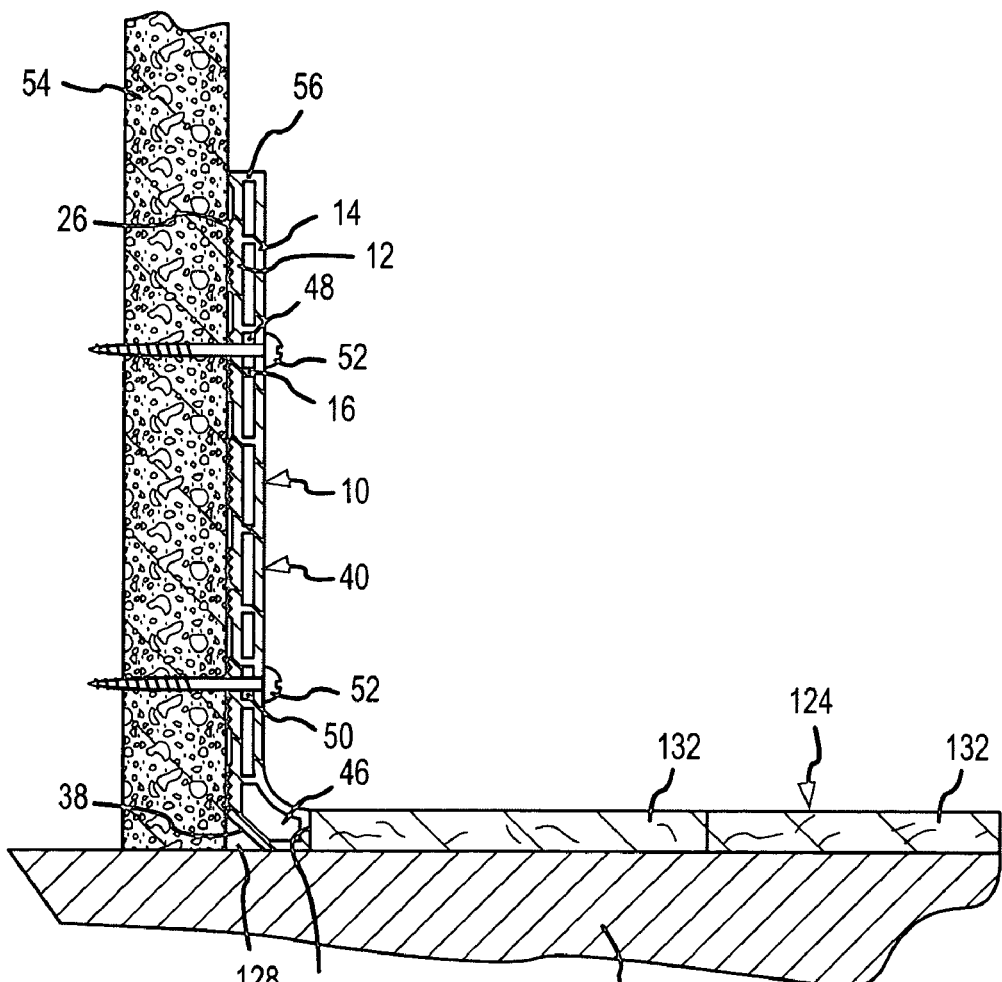
FIG. 18 is an enlarged, fragmentary, cross-sectional view taken along the direction of line 18-18 of FIG. 17, depicting a section of the sanitary cove base depicted in FIGS. 1-6 installed using screws.
Figure 19:
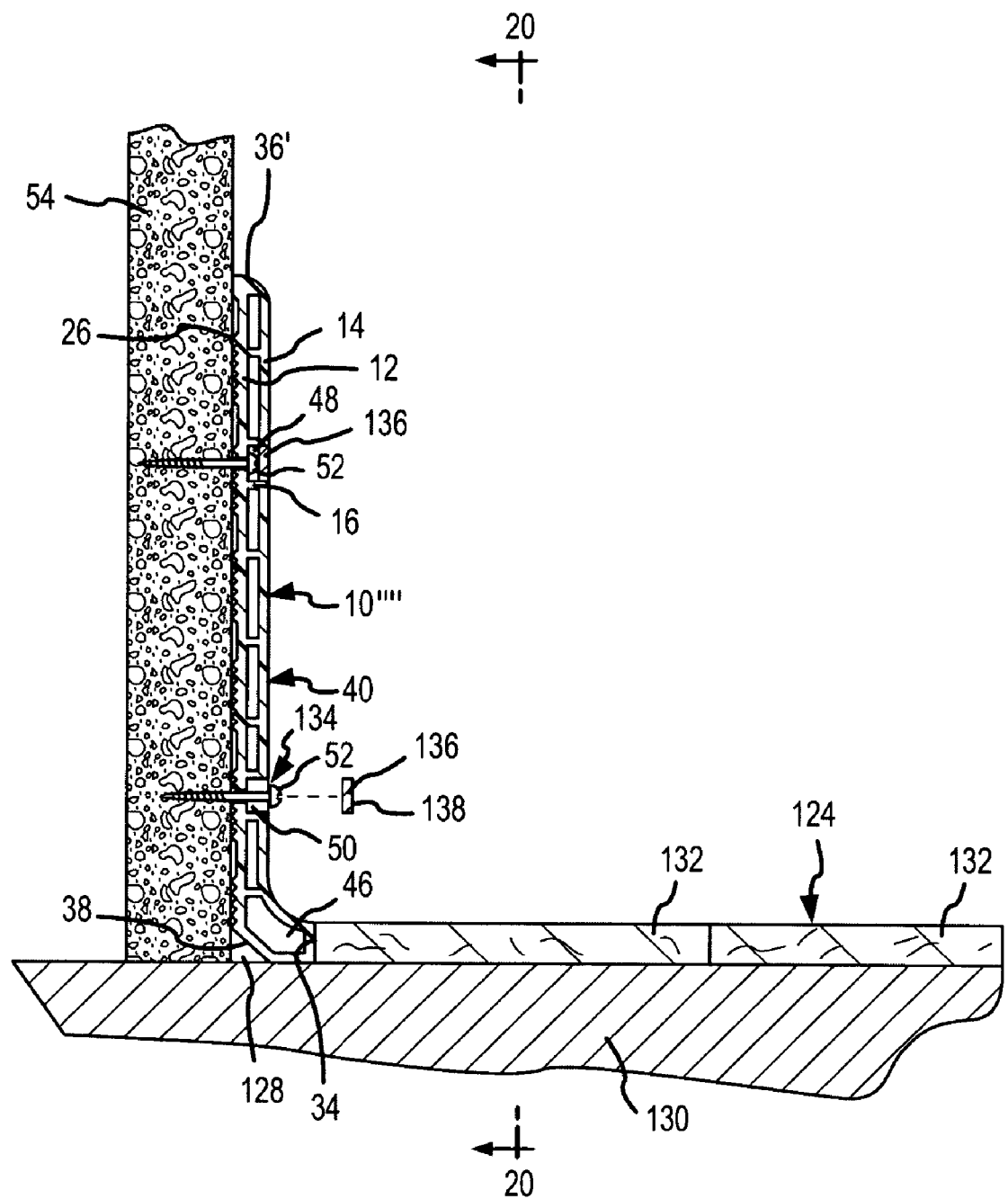
FIG. 19 is an enlarged, fragmentary, cross-sectional view similar to FIG. 18, depicting a fourth alternative embodiment of the sanitary cove base according to the present invention, which is also installed using screws.
Figure 20:
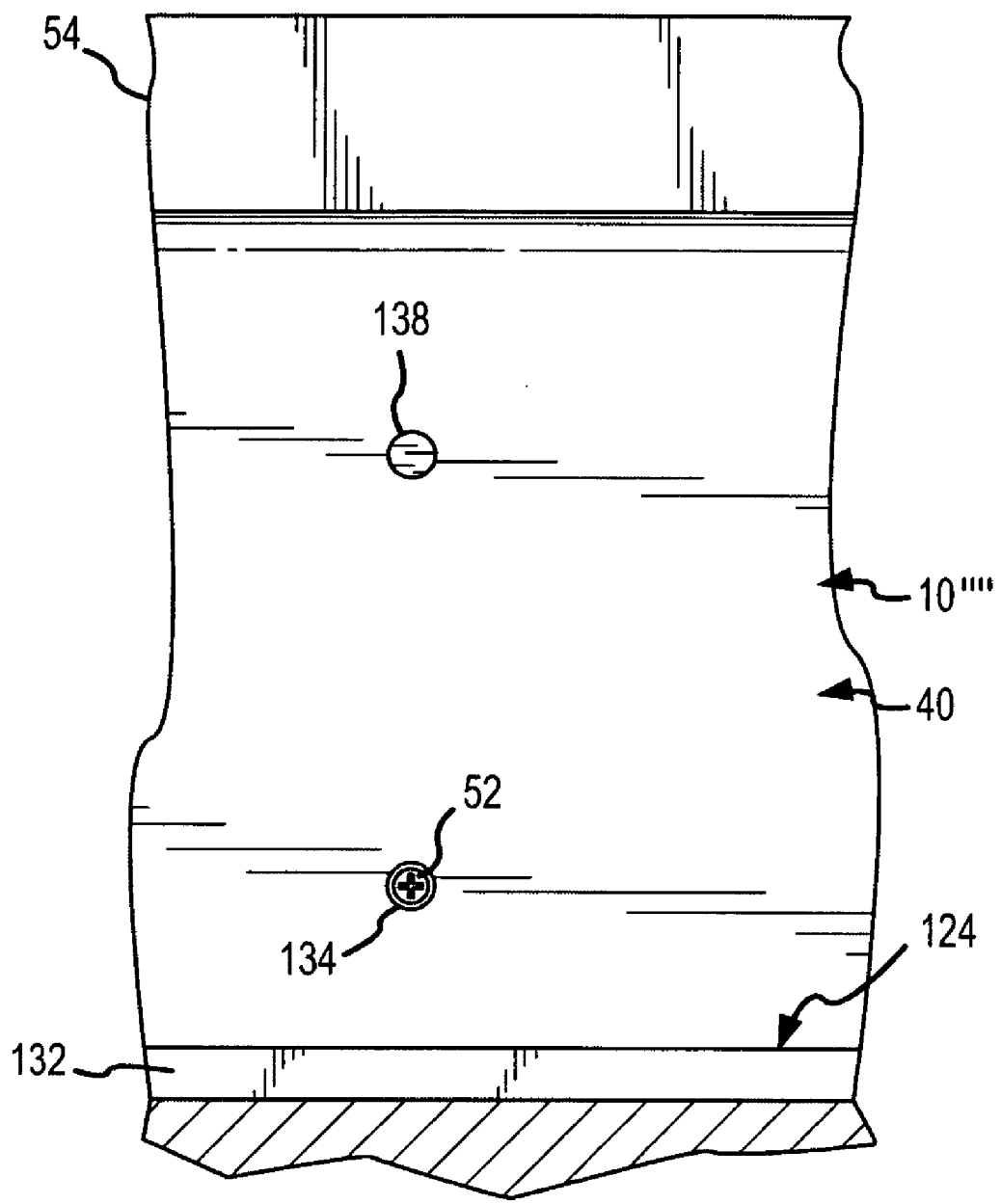
FIG. 20 is an enlarged, fragmentary, front view of the sanitary cove base depicted in FIG. 19, taken in the direction of line 20-20 of FIG. 19 and showing buttons that may be used to plug screw insertion holes.

As shown to best advantage in FIGS. 4 and 6, which depict the longitudinal end 24 (FIG. 1) of the sanitary cove base depicted in FIG. 1-3, this embodiment includes nine hollow channels 18 between the outer wall 12 and inner wall 14 along the vertical portion of the sanitary cove base 10, and a large, lower channel 46 at the bottom or lower end of the sanitary cove base. Among the nine hollow channels are an upper, small hollow channel 48, and a lower, small hollow channel 50. As shown in FIGS. 18-20 and as described further below, when screws 52 (see FIGS. 18-20) are used to attach the sanitary cove base to a wall 54, the screws preferably pass through at least one of the upper, small hollow channel 48 and the lower, small hollow channel 50. In addition to the inner wall 14 and the outer wall 12, the sanitary cover base also has a top wall 56, a sweep wall 58, a floor wall 60, a bottom wall 62, and a chamfer wall 64.

FIG. 6 is similar to FIG. 4, but has been enlarged to show further details and to show dimension information for an embodiment of the sanitary cove base 10 like the one depicted in FIGS. 1-5. As shown in FIG. 6, the walls in this embodiment, including the inner wall 14, the outer wall 12, the top wall 56, the chamfer wall 64, the sweep wall 58, and the floor wall 60, are approximately 0.125 inches thick, and the hollow channels 18 are approximately 0.125 inches wide between the inner wall 14 and outer wall 12. The web members 16 (nine are shown in FIGS. 4 and 6) that separate each hollow channel 18 from any adjacent hollow channel or channels are approximately 0.096 inches wide.

In the embodiment depicted in FIG. 6, the top hollow channel 66 is approximately 0.636 inches high, the second hollow channel 68 from the top is approximately 0.942 inches high, the third hollow channel 48 from the top is approximately 0.404 inches high, the fourth hollow channel 70 from the top is approximately 0.754 inches tall, the fifth hollow channel 72 from the top is approximately 0.923 inches tall, the sixth hollow channel 74 from the top is approximately 0.861 inches tall, the seventh hollow channel 76 from the top is approximately 0.504 inches tall, the eighth hollow channel 50 from the top is approximately 0.404 inches tall, and the ninth hollow channel 78 from the top is approximately 0.817 inches tall. In this embodiment, the third channel from the top is the upper, small hollow channel 48 and the eighth channel from the top is the lower, small hollow channel 50. These latter two hollow channels (48, 50) are the shortest channels out of the nine hollow channels in the vertical portion of the sanitary cove base. Thus, if the sanitary cove base is affixed to a wall 54 with screws 52 as shown in FIG. 18 and as discussed further below, the inner wall 14 is less likely to flex and distort under force of the screws than it would if these two channels (48, 50) were taller. The large, lower channel 40 is approximately 0.641 inches tall vertically.

The hollow channels described above permit the injection of gas and/or cooling water during the manufacturing process, which makes it possible to more accurately and predictably form the sanitary cove base without unacceptable warping and distortion. In particular, the injected gas and the circulated cooling water may be used during an extrusion process to ensure that the sanitary cove base is properly formed and comes out of the mold flat and straight. Extruded parts that have thick areas may warp and distort from, for example, differential cooling that can occur during the extrusion process. The hollow channels also reduce the amount of material that is required to manufacture the sanitary cove base and provide for some give or flexibility of the installed sanitary cove base upon impact. In the configuration depicted in FIGS. 1-6 and 18-20, for example, sufficient material has been removed to avoid differential cooling problems and yet enough material remains that the sanitary cove base is highly resistant to impact damage.

As also shown in FIG. 6, each adhesive ridge 26 in the sections of adhesive ridges may be displaced from the next adjacent adhesive ridge in that set of adhesive ridges by a distance 80 of approximately 0.125 inches. Further, the adhesive ridges extend rearwardly from the outer wall approximately 0.063 inches. The top surface 36 in this embodiment has a width 82 of approximately 0.438 inches, and the flooring material abutment surface has a height 84 of approximately 0.500 inches. The flooring material abutment surface is displaced forwardly from the interior surface 40 of the inner wall 14 by a distance 86 of approximately 0.500 inches. Thus, the flooring material abutment surface is also displaced forwardly of the peaks of the adhesive ridges by a distance of approximately 0.938 inches since the wall-contact crest 32 extends rearwardly from the wall-facing surface 20 the same distance (0.063 inches) that the adhesive ridges 26 extend rearwardly from the wall-facing surface. Finally, the overall height 90 of the sanitary cove base 10 according to this embodiment, from the bottom surface 22 to the top surface 36, is approximately 8.00 inches. Since baseboard is typically six inches tall, making the sanitary cove base according to the present invention eight inches tall also helps to reduce the amount of water that reaches the wall-facing surface 20 over the top of the baseboard.

Although the sanitary cove base 10 depicted in FIG. 6 is approximately 8.00 inches high, the sanitary cove base could be made to any desired overall height. For example, since many older buildings were constructed with six-inch-high baseboards, the sanitary cove base according to the present invention could be made six inches high to simplify the task of retrofitting older buildings with the sanitary cove base according to the present invention. Similarly, the sanitary cove base could be made taller than eight inches, and the upper edge 36 of the sanitary cove base 10 could be notched if necessary to accommodate, for example, existing plumbing. The sanitary cove base according to the present invention may be manufactured or cut into twelve- or fourteen-foot lengths, for example, to minimize the number of joints along the installed baseboard and to facilitate shipping. The sanitary cove base may, however, be manufactured or cut to any desired length.

Figure 7:
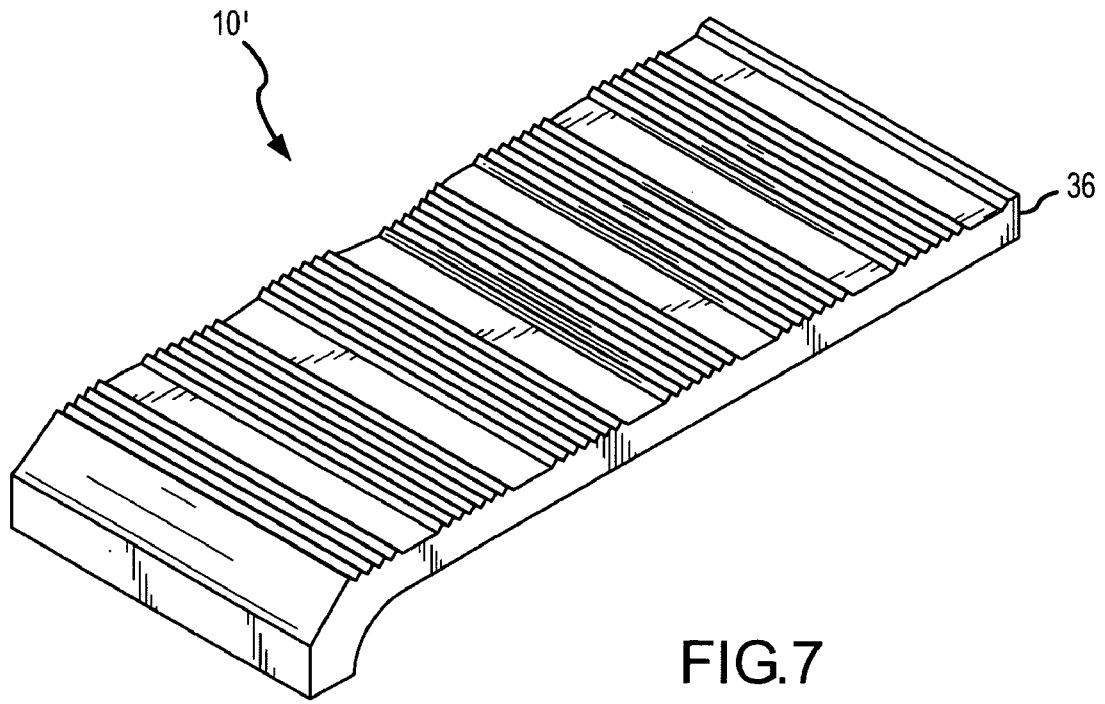
FIG. 7 is similar to FIG. 1, but depicts a first alternative embodiment of a sanitary cove base according to the present invention.
Figure 8:
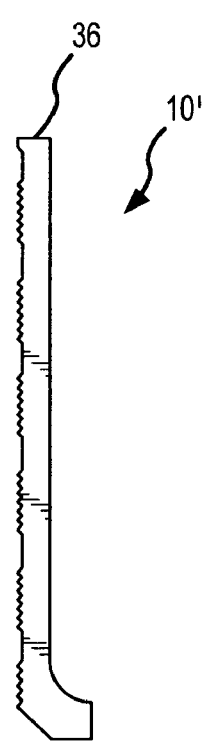
FIG. 8 is similar to FIGS. 4 and 6, but depicts a longitudinal end of the first alternative embodiment of the sanitary cove base depicted in FIG. 7.

FIGS. 7 and 8 are similar to FIGS. 1 and 4, respectively. In this first alternative embodiment of the sanitary cove base 10', however, the hollow channels 18 have been removed. This first alternative embodiment of the sanitary cove base can resist even more impact than can be resisted by the embodiment depicted in FIGS. 1-6. Since the first alternative embodiment depicted in FIGS. 7 and 8 lacks the hollow channels depicted in the embodiment of FIGS. 1-6, a somewhat different process may be necessary to form the sanitary cove base depicted in FIGS. 7 and 8. The first alternative embodiment of the sanitary cove base may, for example, be milled from a solid block of material rather than being molded or extruded into the depicted configuration.

Figure 9:
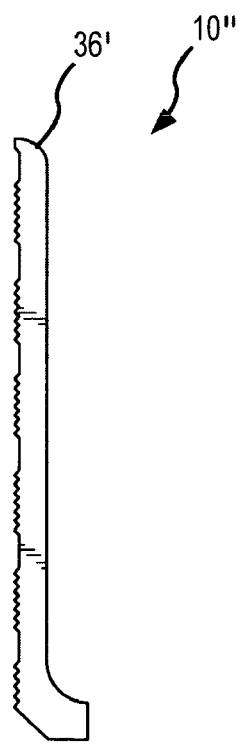
FIG. 9 depicts a second alternative embodiment of the sanitary cove base according to the present invention, which has a curved top surface.
Figure 10:
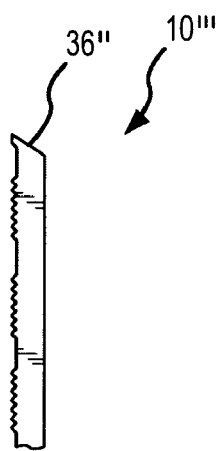
FIG. 10 depicts a third alternative embodiment of the sanitary cove base according to the present invention, which has a sloped top surface.

FIG. 9 depicts a second alternative embodiment of the sanitary cove base 10" according to the present invention. The embodiment of FIG. 9 has a curved top surface 36', which may enhance safety while providing for a more sanitary environment. Similarly, FIG. 10 depicts a third alternative embodiment of the sanitary cove base 10'" according to the present invention. In the embodiment depicted in FIG. 10, a sloped top surface 36" is present, which may again provide for enhanced safety and a more sanitary environment. These alternative configurations for the top surface may be used in combination with any of the other embodiments described in this specification. For example, the fourth alternative embodiment of the sanitary cove base 10"" (FIGS. 19 and 20) has a curved top surface 36'.

Figure 11:
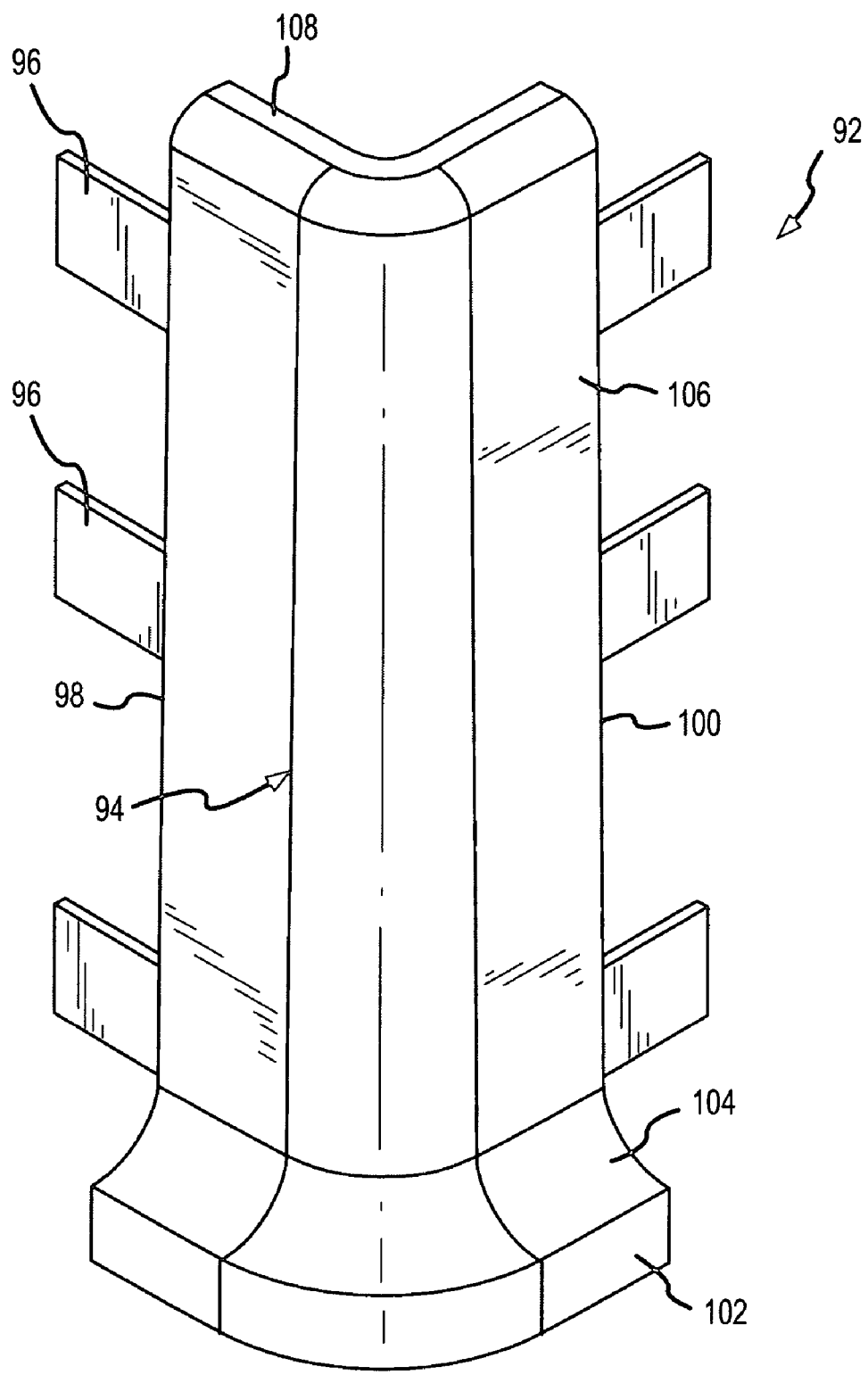
FIG. 11 depicts a molded outside corner that may be used in combination with the embodiment of the sanitary cove base depicted in FIGS. 19 and 20.

Whenever sanitary cove base must be installed along a surface that includes corners (see, e.g., FIGS. 17 and 19), molded corners (see FIGS. 11-15) may be used, or a miter joint (FIG. 16) may be created. Referring first to FIG. 11, one embodiment of a molded outside corner 92 is described next. The molded outside corner 92 depicted in FIG. 11 includes a main body portion 94 and a plurality of integrated alignment tabs 96 that extend from the main body portion 94. In particular, the main body portion has a first edge 98 from which three integrated alignment tabs extend and a second edge 100 from which three additional integrated alignment tabs extend. Each of these alignment tabs 96 extends into one of the hollow channels 18 in the sanitary cove base, thereby providing for a tighter joint to meet the demands of the relatively hostile environment in which these baseboards are frequently installed. The profile of the first edge 98 and the profile of the second edge 100 match the profile of the longitudinal end 24 of the sanitary cove base 10. Thus, the molded outside corner 92 includes a flooring material abutment surface 102, a sanitary sweep 104, an interior surface 106, and a top surface 108. When the sanitary cove base sections are slid onto the integrated alignment tabs 96 of the molded outside corner 92, a tight fit results between the molded outside corner and the sanitary cove base. The longitudinal ends of the two sections of the sanitary cove base that are attached to the molded outside corner may be glued to the first or second edges 98, 100 of the molded outside corner to minimize potential seeping of moisture to the wall-facing surface 20 of the sanitary cove base.

Figure 12:
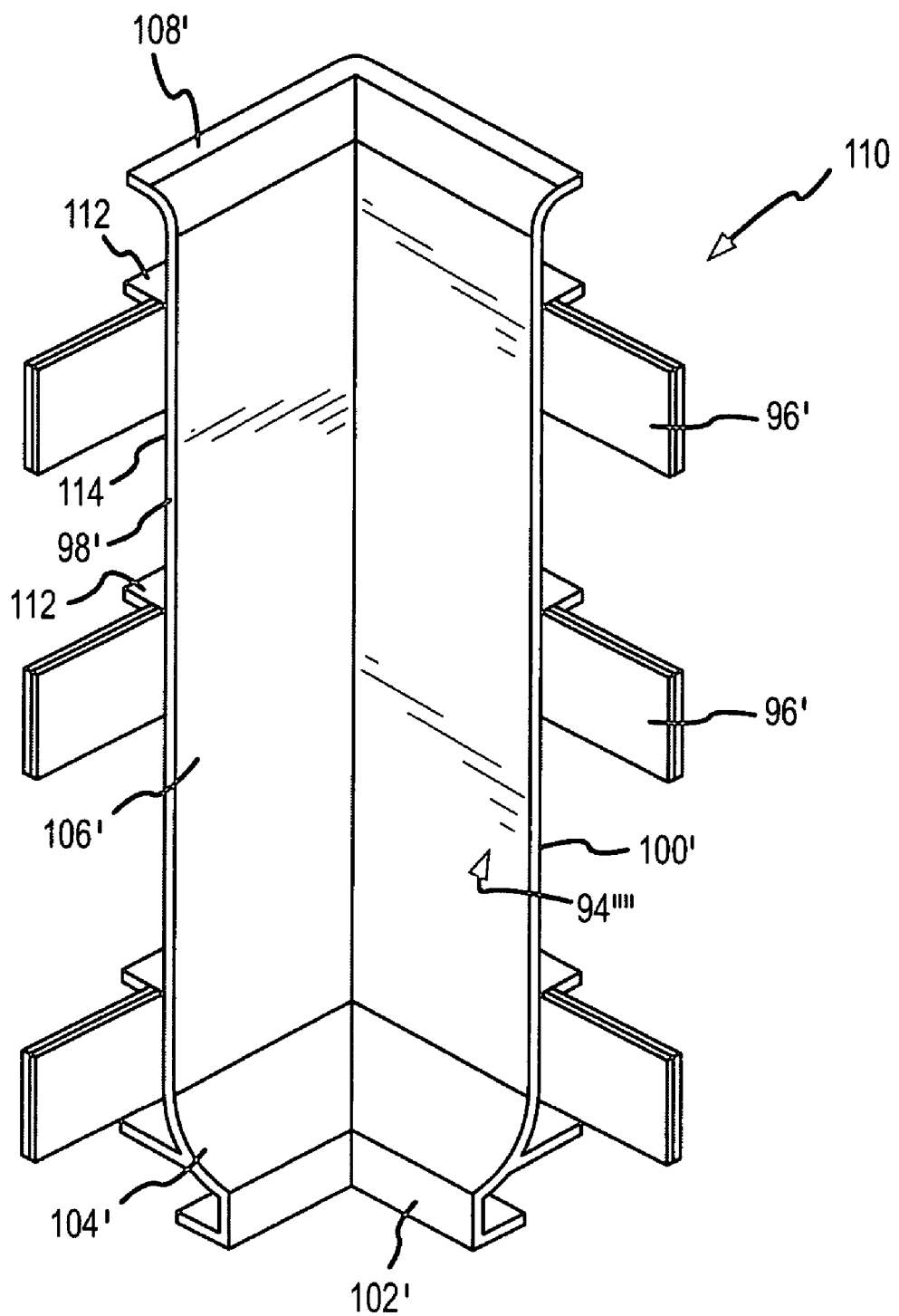
FIG. 12 depicts a molded inside corner that may be used in combination with the embodiment of the sanitary cove base depicted in FIGS. 19 and 20.

FIG. 12 is similar to FIG. 11, but depicts one embodiment of a molded inside corner 110 that may be used in combination with the sanitary cove base 10 depicted in, for example, FIGS. 1-6. This molded inside corner 110 again includes a plurality of integrated alignment tabs 96'. In particular, in the configuration depicted in FIG. 12, three integrated alignment tabs extend from the first edge 98' of the molded inside corner and three other integrated alignment tabs extend from the second edge 100' of the molded inside corner. Again, there is profile matching between the edges (98', 100') of the molded inside corner 110 and the longitudinal ends 24 of the sanitary cove base 10. Therefore, the molded inside corner again includes a flooring material abutment surface 102, a sanitary sweep 104', an interior surface 106', and a top surface 108'. As shown to best advantage in FIG. 12, ribs 112 may be present on a wall-facing surface of the molded inside corner 110.

Figure 13:
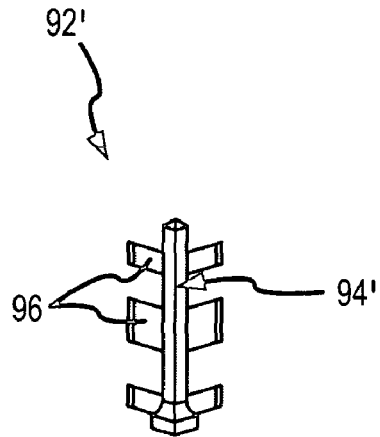
FIG. 13 depicts a first alternative molded outside corner that may be used in combination with the embodiment of the sanitary cove base depicted in FIGS. 19 and 20.

FIG. 13 depicts a first alternative molded outside corner 92'. In this first alternative molded outside corner, integrated alignment tabs 96 are again used. The main body portion 94' of the molded outside corner 92' depicted in FIG. 13 is different from the main body portion 94 of the molded outside corner 92 depicted in FIG. 11. Depending upon the type of finished look that is desired, the configuration of the main body portion may be adjusted as demonstrated by comparing the main body portion 94 depicted in FIG. 11 with the main body portion 94' depicted in FIG. 13.

Figure 14:
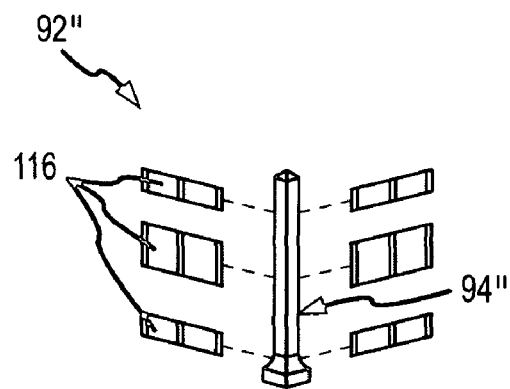
FIG. 14 depicts a second alternative molded outside corner that is similar to the molded outside corner depicted in FIG. 13, but having removable alignment strips rather than integrated alignment tabs.

FIG. 14 depicts a second alternative molded outside corner 92" according to the present invention. This second alternative molded outside corner is similar to the first alternative molded outside corner 92". In the molded outside corner 92" depicted in FIG. 14, however, the integrated alignment tabs 96 (FIG. 13) have been replaced by removable alignment strips 116. One end of each alignment strip is inserted into a slot in the main body portion 94" of this second alternative molded outside corner, and the opposite end of each alignment strip would be inserted into one of the hollow cavities 18 in the sanitary cove base 10.

Figure 15:
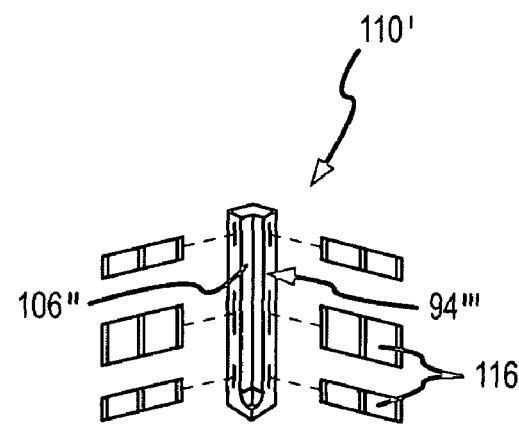
FIG. 15 depicts an alternative molded inside corner having removable alignment strips.

FIG. 15 depicts an alternative molded inside corner 110'. This alternative molded inside corner is different from the molded inside corner 110 depicted in FIG. 12 in a number of ways. For example, the alternative molded inside corner 110' depicted in FIG. 15 has a relatively more solid main body portion 94''' than the main body portion 94"" depicted in FIG. 12. Also, the interior surface 106" of the alternative molded inside corner 110' is smaller than the inside surface 106' of the molded inside corner 110 depicted in FIG. 12. Although the alternative molded inside corner 110' depicted in FIG. 15 is shown with removable alignment strips like those depicted in FIG. 14, the alignment strips 116 could be replaced with integrated alignment tabs (96, 96') like those shown in FIGS. 11-13.

Figure 16:
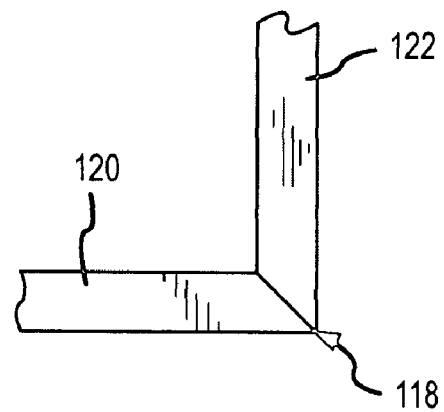
FIG. 16 is a top view looking downwardly at a miter joint between a first section of sanitary cove base and a second section of sanitary cove base.

As shown in FIG. 16, which is a top-down view of a corner, it may be possible to eliminate the molded outside corners and molded inside corners by using mitered joints 118. Such mitered joints may be particularly useful with embodiments like those depicted in FIGS. 7-10. In particular, FIG. 16 depicts a first section 120 of sanitary cove base being joined to a second section 122 of sanitary cove base at a miter joint 118. In other words, in the embodiment depicted in FIG. 16, the longitudinal ends of the two sections of sanitary cove base have been cut at 45 degrees so that they may be assembled as shown at FIG. 16. If desired, an adhesive may be used on the cut longitudinal ends of the sanitary cove base to bolster the strength of the joint and reduce the opportunities for moisture to seep from the interior surface of the sanitary cove base to the wall-facing surface of the sanitary cove base. Although FIG. 16 depicts an outside corner, a miter joint can also be used for an inside corner.

Figure 17:
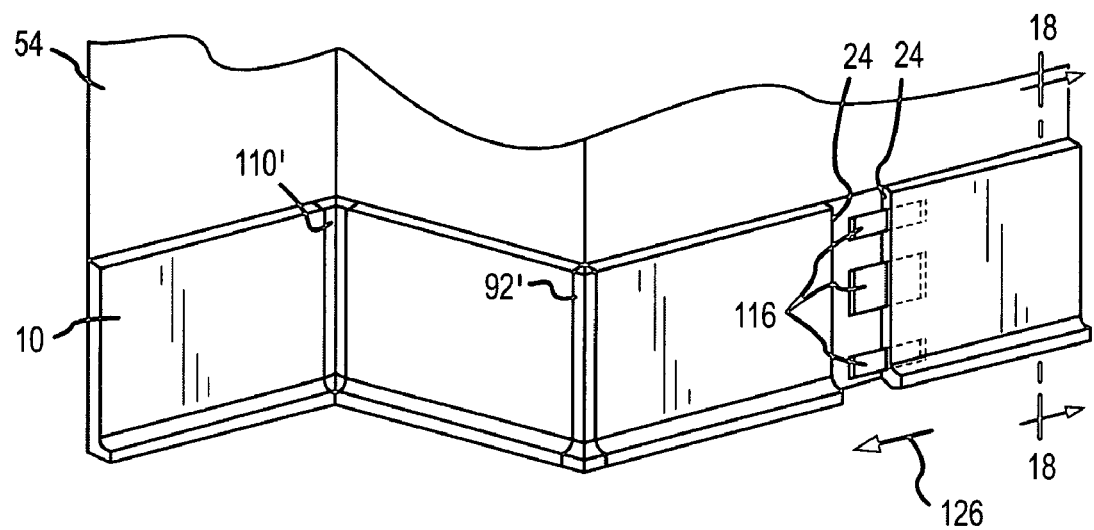
FIG. 17 is a fragmentary, isometric view of the sanitary cove base depicted in FIGS. 1-6 installed along the lower edge of a wall section that includes a jog, requiring the use of a molded outside corner and a molded inside corner.

FIG. 17 is an isometric view of a wall section 54 having a jog in it and sanitary cove base according to the present invention installed along its lower edge. In particular, FIG. 17 depicts the sanitary cove base 10 depicted in, for example, FIGS. 1-6 combined with a molded inside corner 110' (FIG. 15) and a molded outside corner (92', 92") (see, e.g., FIGS. 13 and 14). In FIG. 17, the flooring material 124 (e.g., FIG. 18) has not yet been installed. Although the sanitary cove base according to the instant invention is shipped in relatively long lengths (e.g., twelve- or fourteen-foot lengths), it may be necessary when traversing a long, straight section of wall to attach two pieces of sanitary cove base to each other to span a distance longer than a single piece of cove base. In the right hand portion of FIG. 17, just this situation has occurred. Thus, the longitudinal end 24 of one section of sanitary cove base 10 is depicted about to be attached to the longitudinal end of a second section of sanitary cove base using a plurality of alignment strips 116. The alignment strips are depicted inserted into hollow channels formed in the sections of sanitary cove base. The direction arrow 126 depicted in FIG. 17 shows that the section of sanitary cove base in which the alignment strips have already been inserted must be moved leftwardly as depicted in FIG. 17 until the exposed ends of the alignment strips become fully engaged in appropriate hollow channels in the adjacent section of sanitary cove base. Again, adhesive may be used on the longitudinal ends of the two sections of sanitary cove base being joined to enhance the integrity of the joint and reduce the opportunities for moisture to seep from the interior surface of the sanitary cove base to the wall-facing surface of the sanitary cove base.

FIG. 18 is a fragmentary, cross-sectional view taken along the direction of line 18-18 of FIG. 17. In FIG. 18, a section of sanitary cove base 10 according to the embodiment depicted in FIGS. 1-6 has been screwed to a wall 54 using two attachment screws 52. As mentioned above, each screw is preferably screwed through the sanitary cove base so as to pass through at least one of the upper, small hollow channel 48 or the lower, small hollow channel 50. These upper and lower, small hollow channels have a narrow vertical height as explained above. In other words, each screw has a web member 16 adjacent to it when the screws are inserted through the sanitary cove base so as to pass through the upper, small hollow channel 48 or the lower, small hollow channel 50. This allows the installer to tighten the screws without excessively distorting or flexing the interior surface 40 of the sanitary cove base, which leads to a potentially more aesthetic installation and helps to prevent undue stressing of the interior surface of the sanitary cove base.

As clearly shown in FIG. 18, a section of adhesive ridges 26 is present on the wall-facing surface of the sanitary cove base at both locations where the screws pass through the outer wall of the sanitary cove base. This again permits the installer to appropriately tighten the screws 52 without inappropriately distorting the sanitary cove base. In order to ensure that the screws are threaded through the sanitary cove base at the proper locations (i.e., so as to pass through the center of either the upper, small hollow channel 30 or the center of the lower, small hollow channel 50), the interior surface 40 of the sanitary cove base may be appropriately marked. For example, a screw placement indentation or line may be placed on the interior surface at the location where the screws are to be inserted through the sanitary cove base. Alternatively, a chalk line may be snapped onto the interior surface of the sanitary cove base and then removed after the screws have been installed.

As also clearly shown in FIG. 18, the chamfer 38 creates a relief region 128 at the juncture of the wall 54 and the subfloor 130. This relief region 128 makes it easier to install the sanitary cove base despite slight irregularities in the juncture between the wall and the subfloor, and also reduces room preparation time and thereby facilitates installation of a sanitary cove base since a small amount of debris may remain without interfering with the installation of the sanitary cove base according to the present invention. In the configuration depicted in FIG. 18, floor tiles 132 (e.g., ceramic or clay tiles) have been installed on the upper surface of the subfloor 130. The flooring material abutment surface 34 of the sanitary cove base is designed to flowingly meet with the edges of, for example, the clay tiles as shown in FIG. 18. A caulking compound or grout or adhesive may be place in the gaps between the tiles and the gap between the flooring material abutment surface and the tiles affixed to the subfloor adjacent to the flooring material abutment surface of the sanitary cove base.

FIG. 19 is similar to FIG. 18, but is an enlarged, fragmentary, cross-sectional view of a fourth alternative embodiment of the sanitary cove base 10'''' according to the present invention. As with the embodiment depicted in FIG. 18, in the embodiment depicted in FIGS. 19 and 20, screws 52 are again used to hold the sanitary cove base 10'''' snuggly against the structural wall 54. In the embodiment depicted in FIGS. 19 and 20, screw insertion holes 134 have been drilled through the inner wall 14. Preferably, these screw insertion holes are centered over either the upper, small hallow channel 48 or the lower, small hallow channel 50. These screw insertion holes 134 may be, for example, one-half inch holes through which the heads of the screws 52 may freely travel. As clearly depicted in FIGS. 19 and 20, once the attachment screws 52 are in place and snug against the inner surface of the outer wall 12, buttons 136 may be used to plug the screw insertion holes 134. The perimeter or circumference of each button 136 may, for example, be configured to snap into one of the screw insertion holes 134, resulting in the top surface 138 of the buttons 136 be flush with the interior surface 40 of the inner wall 14. These buttons provide a more aesthetic or finished appearance to the installed sanitary cove base 10'''', yet permit the use of attachment screws 52 to securely hold the sanitary cove base against the structural wall 54. Also, when the heads of the screws 52 are snug against the inner surface of the outer wall 12 rather than against the interior surface 40 of the inner wall 14, undesirable distortion of the inner wall 14 is reduced or eliminated.

Figure 21:
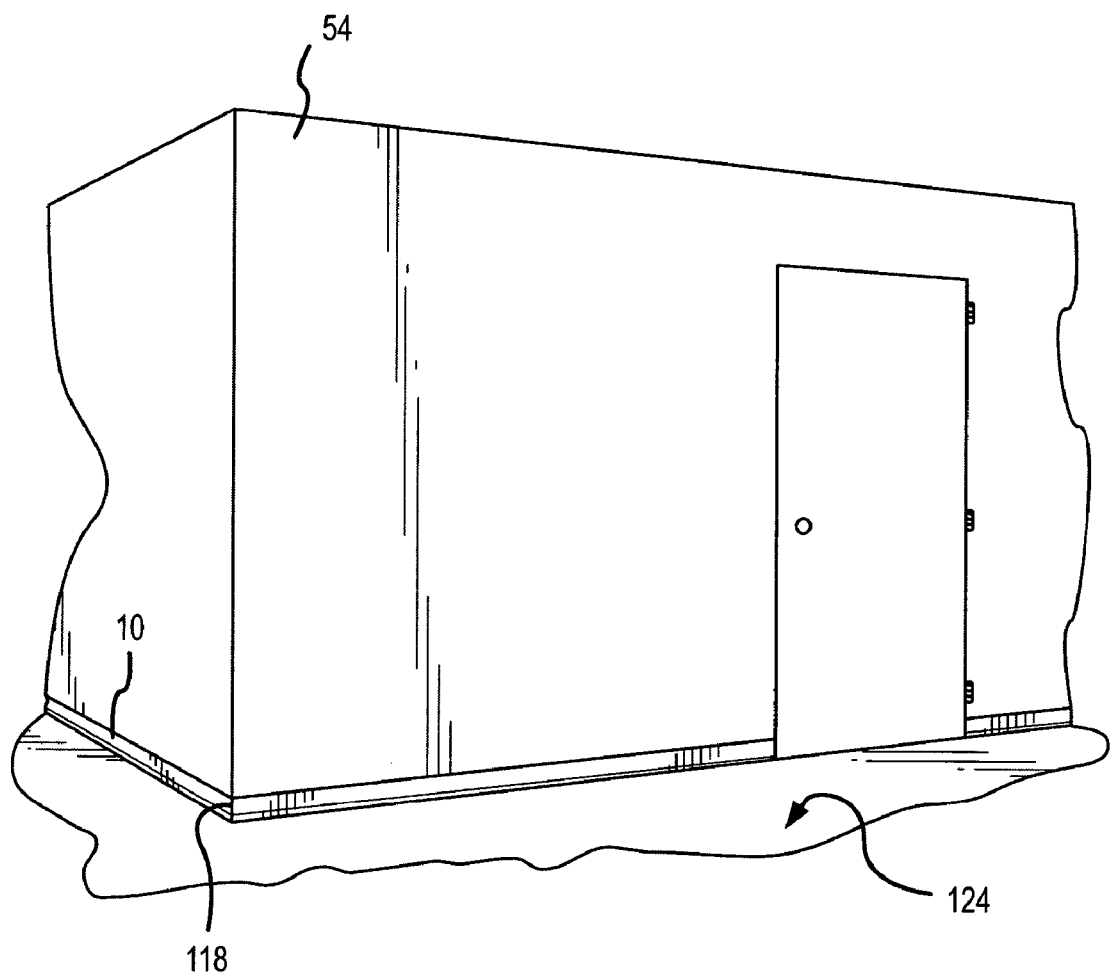
FIG. 21 depicts the sanitary cove base according to the present invention installed in a room and demonstrates diagrammatically how the present invention reduces the number of joints along the cove base.

FIG. 21 depicts two walls of a room having sanitary cove base according to the present invention installed along the lower edges of the walls 54. As shown schematically in FIG. 21, the number of joints between pieces of cove base has been minimized to reduce the number of paths for moisture to escape from the interior surface of the cove base to the wall-facing surface of the cove base. By reducing the potential path for undesirable moisture seepage, a longer-lasting installation may be achieved. FIG. 21 also depicts use of a miter joint 118 (FIG. 16).

This invention minimizes the number of baseboard joints. Further, the sanitary cove base may be constructed from a material that resists mold and rotting, and which is highly resistant to damage from, for example, cart or palate jack impact. Although a number of embodiments of this invention have been described above with a certain degree of particularity, those skilled in the art could make numerous alterations to the disclosed embodiments without departing from the spirit or scope of this invention. For example, as suggested above in connection with FIGS. 8-10, the shape of the top surface and the particular configuration of the transition from the top surface to the interior surface of the sanitary cove base may be adjusted to suit a particular situation. All directional references (e.g., upper, lower, upward, downward, left, right, leftward, rightward, top, bottom, above, below, vertical, and horizontal) are only used for identification purposes to aid the readers' understanding of the present invention and do not create limitations, particularly as to the position, orientation, or use of the invention. It is intended that all matter contained in the above description or shown in the accompanying drawings shall be interpreted as illustrative and not limiting. Changes in detail or structure may be made without departing from the spirit of the invention as defined in the appended claims.

What is claimed is:

1. A sanitary cove base comprising the following:
   an outer wall; said outer wall having a plurality of sections of adhesive ridges; and a plurality of relief valleys, wherein each section of adhesive ridges of said plurality of sections of adhesive ridges is separated from a next adjacent section of adhesive ridges of said plurality of sections of adhesive ridges by a relief valley of said plurality of relief valleys said outer wall having a plurality of sections of adhesive ridges, and a plurality of relief valleys, wherein each section of adhesive ridges of said plurality of sections of adhesive ridges is separated from a next adjacent section of adhesive ridges of said plurality of sections of adhesive ridges by a relief valley of said plurality of relief valleys;
   an inner wall having an interior surface, wherein said interior surface comprises a sanitary sweep and an abutment surface adapted to abut adjacent flooring;
   a plurality of longitudinally-extending web members existing between said outer wall and said inner wall, thereby connecting said outer wall to said inner wall;
   a plurality of hollow channels, each hollow channel being defined between
      said inner wall,
      said outer wall,
      a first longitudinally-extending web member of said plurality of longitudinally-extending web members, and
      a next adjacent longitudinally-extending web member of said plurality of longitudinally-extending web members;

a top wall;
a sweep wall; said sweep wall having a curve portion; having a curved portion;
a floor wall;
a bottom wall; and
a chamfer wall.

2. The sanitary cove base of claim 1, wherein said top wall, said inner wall, said sweep wall, said floor wall, said bottom wall, said chamfer wall, and said outer wall are all approximately 0.125 inches thick.

3. The sanitary cove base of claim 1, wherein said chamfer wall is adapted to form a relief region at a juncture of an adjacent wall and subfloor where the sanitary cove base is installed.

4. A sanitary cove base comprising the following:
an outer wall; said outer wall having a plurality of sections of adhesive ridges; and a plurality of relief valleys, wherein each section of adhesive ridges of said plurality of sections of adhesive ridges is separated from a next adjacent section of adhesive ridges of said plurality of sections of adhesive ridges by a relief valley of said plurality of relief valleys said outer wall having a plurality of sections of adhesive ridges, and a plurality of relief valleys, wherein each section of adhesive ridges of said plurality of sections of adhesive ridges is separated from a next adjacent section of adhesive ridges of said plurality of sections of adhesive ridges by a relief valley of said plurality of relief valleys;
an inner wall having an interior surface, wherein said interior surface comprises a sanitary sweep and an abutment surface adapted to abut adjacent flooring;
a plurality of longitudinally-extending web members existing between said outer wall and said inner wall, thereby connecting said outer wall to said inner wall;
a plurality of hollow channels, each hollow channel being defined between
said inner wall,
said outer wall,
a first longitudinally-extending web member of said plurality of longitudinally-extending web members, and
a next adjacent longitudinally-extending web member of said plurality of longitudinally-extending web members;
a lower end, wherein a large, lower channel extends through said lower end; and
a vertical portion, wherein said vertical portion comprises a plurality of hollow channels, and wherein said plurality of hollow channels comprises
a top hollow channel;
a second hollow channel, said second hollow channel located below said top hollow channel;
a third hollow channel, said third hollow channel located below said second hollow channel;
a fourth hollow channel, said fourth hollow channel located below said third hollow channel;
a fifth hollow channel, said fifth hollow channel located below said fourth hollow channel;
a sixth hollow channel, said sixth hollow channel located below said fifth hollow channel;
a seventh hollow channel, said seventh hollow channel located below said sixth hollow channel;
an eighth hollow channel, said eighth hollow channel located below said seventh hollow channel; and
a ninth hollow channel, said ninth hollow channel located below said eighth hollow channel and above said large, lower channel.

5. The sanitary cove base of claim 4, wherein said third hollow channel is an upper, small hollow channel; wherein said eighth hollow channel is a lower, small hollow channel; and wherein said upper, small hollow channel and said lower, small hollow channel are shorter than each of said top hollow channel, said second hollow channel, said fourth hollow channel, said fifth hollow channel, said sixth hollow channel, said seventh hollow channel, and said ninth hollow channel.

6. The sanitary cove base of claim 5, wherein said upper, small hollow channel and said lower, small hollow channel are each adapted to receive an attachment screw.

7. The sanitary cove base of claim 4, wherein
said top hollow channel is approximately 0.636 inches high vertically;
said second hollow channel is approximately 0.942 inches high vertically;
said third hollow channel is approximately 0.404 inches high vertically;
said fourth hollow channel is approximately 0.754 inches tall vertically;
said fifth hollow channel is approximately 0.923 inches tall vertically;
said sixth hollow channel is approximately 0.861 inches tall vertically;
said seventh hollow channel is approximately 0.504 inches tall vertically;
said eighth hollow channel is approximately 0.404 inches tall vertically;
said ninth hollow channel is approximately 0.817 inches tall vertically; and
said large, lower channel is approximately 0.641 inches tall vertically.

8. The sanitary cove base of claim 4, wherein each of said hollow channels is approximately 0.125 inches wide between said inner wall and said outer wall.

9. The sanitary cove base of claim 4, wherein said plurality of longitudinally-extending web members comprises nine longitudinally-extending web members that extend between said outer wall and said inner wall; and wherein each of said nine longitudinally-extending web members separates one of said top hollow channel, said second hollow channel, said third hollow channel, said fourth hollow channel, said fifth hollow channel, said sixth hollow channel, said seventh hollow channel, said eighth hollow channel, said ninth hollow channel, and said large, lower channel from a next adjacent hollow channel.

10. The sanitary cove base of claim 4, wherein each of said web members is approximately 0.096 inches thick vertically.

11. A sanitary cove base comprising the following:
an outer wall; said outer wall having a plurality of sections of adhesive ridges; and a plurality of relief valleys, wherein each section of adhesive ridges of said plurality of sections of adhesive ridges is separated from a next adjacent section of adhesive ridges of said plurality of sections of adhesive ridges by a relief valley of said plurality of relief valleys said outer wall having a plurality of sections of adhesive ridges, and a plurality of relief valleys, wherein each section of adhesive ridges of said plurality of sections of adhesive ridges is separated from a next adjacent section of adhesive ridges of said plurality of sections of adhesive ridges by a relief valley of said plurality of relief valleys;
an inner wall having an interior surface, wherein said interior surface comprises a sanitary sweep and an abutment surface adapted to abut adjacent flooring;

a plurality of longitudinally-extending web members existing between said outer wall and said inner wall, thereby connecting said outer wall to said inner wall;

a plurality of hollow channels, each hollow channel being defined between
- said inner wall,
- said outer wall,
- a first longitudinally-extending web member of said plurality of longitudinally-extending web members, and
- a next adjacent longitudinally-extending web member of said plurality of longitudinally-extending web members;

a lower end having a large, lower channel extending therethrough; and a vertical portion, wherein said vertical portion comprises
- at least a first part of said outer wall;
- at least a first part of said inner wall; and
- a plurality of hollow channels, wherein said plurality of hollow channels comprises
  - an upper, small hollow channel; and
  - a lower, small hollow channel.

12. The sanitary cove base of any one of claim 11 or 4, further comprising a chamfer adapted to form a relief region at a juncture of an adjacent wall and subfloor where the sanitary cove base is installed.

13. The sanitary cove base of claim 12, wherein the relief region is configured to facilitate installation of the sanitary cove base despite irregularities at the juncture of the adjacent wall and subfloor.

14. The sanitary cove base of claim 12, wherein the relief region is configured to reduce room preparation time and thereby facilitates installation of the sanitary cove base since a small amount of debris may remain without interfering with the installation of the sanitary cove base.

15. The sanitary cove base of any one of claim 11, 4, or 1, wherein said sanitary cove base is constructed from material selected from the group consisting of Acrylonitrile-Butadiene-Styrene, polypropylene, high-density polyethylene, and Polyvinyl Chloride.

16. The sanitary cove base of any one of claim 11, 4, or 1, wherein said sanitary cove base is made with the following composition: 98% polyethylene plastic, 1% coloring agent, ½% foaming agent, and ½% anti-fungal material.

17. The sanitary cove base of claim 16, wherein said sanitary cove base is milled from a solid block of material.

18. The sanitary cove base of claim 16, wherein said sanitary cove base is extruded.

19. The sanitary cove base of any one of claim 11, 4, or 1, wherein said abutment surface is displaced forwardly from said interior surface of said inner wall by a distance of approximately 0.500 inches.

20. The sanitary cove base of any one of claim 11, 4, or 1 further comprising
- a first plurality of screw insertion holes through said inner wall and adapted to accept an attachment screw; and
- a second plurality of buttons, each button being frictionally received in one of said first plurality of screw insertion holes.

21. The sanitary cove base of any one of claim 11, 4, or 1, wherein the plurality of hollow channels are adapted to receive injected gas and/or cooling water during manufacturing of the cove base to facilitate more accurate and predictable formation of the sanitary cove base without the sanitary cove base unacceptably warping and/or distorting.

22. The sanitary cove base of any one of claim 11, 4, or 1, wherein said sanitary cove base further comprises
- a wall-facing surface of said outer wall;
- a top surface; and
- a bottom surface.

23. The sanitary cove base of claim 22, wherein said wall-facing surface of said outer wall further comprises
- a chamfer;
- a plurality of adhesive ridges;
- a plurality of relief valleys; and
- a wall-contact crest.

24. The sanitary cove base of claim 22, wherein said top surface has a width of approximately 0.438 inches, and wherein said abutment surface has a height of approximately 0.500 inches.

25. The sanitary cove base of claim 22, wherein said top surface extends horizontally between said wall-facing surface and said interior surface.

26. The sanitary cove base of claim 22, wherein said top surface extends between said wall-facing surface and said interior surface, and wherein said top surface is substantially horizontal adjacent to said wall-facing surface and is substantially vertical adjacent to said interior surface.

27. The sanitary cove base of claim 22, wherein said top surface extends between said wall-facing surface and said interior surface, and wherein said top surface slopes downwardly between said wall-facing surface and said interior surface.

28. The sanitary cove base of claim 22, wherein said top surface is curved.

29. The sanitary cove base of claim 22, wherein said top surface is flat.

30. The sanitary cove base of claim 22, wherein the sanitary cove base has an overall height from said bottom surface to said top surface of approximately 8.0 inches.

31. The sanitary cove base of claim 22 further comprising a wall-contact crest extending rearwardly from said wall-facing surface of said outer wall, wherein said plurality of relief valleys comprises an upper relief valley, wherein said plurality of sections of adhesive ridges comprises an upper section of adhesive ridges, and wherein said upper relief valley separates said upper section of adhesive ridges from said wall-contact crest.

32. The sanitary cove base of claim 31, wherein a top sidewall of said upper relief valley connects said wall-contact crest to a floor of said upper relief valley.

33. The sanitary cove base of claim 22 further comprising a wall-contact crest that extends rearwardly from said wall-facing surface of said outer wall a first distance, wherein each adhesive ridge of said plurality of sections of adhesive ridges extends rearwardly from said wall-facing surface of said outer wall a second distance, and wherein said first distance equals said second distance.

34. The sanitary cove base of claim 22, wherein each adhesive ridge within a first section of adhesive ridges is displaced from a next adjacent adhesive ridge in said first section of adhesive ridges by a distance of approximately 0.125 inches.

35. The sanitary cove base of claim 22, wherein said adhesive ridges extend rearwardly from said wall-facing surface of said outer wall approximately 0.063 inches.

* * * * *

UNITED STATES PATENT AND TRADEMARK OFFICE
CERTIFICATE OF CORRECTION

| | | |
|---|---|---|
| PATENT NO. | : 7,793,469 B2 | |
| APPLICATION NO. | : 10/821752 | |
| DATED | : September 14, 2010 | |
| INVENTOR(S) | : William R. Murphy, Jr. and James L. Wood | |

It is certified that error appears in the above-identified patent and that said Letters Patent is hereby corrected as shown below:

Col. 10, lines 46-52, Col. 11, lines 22-28 and Col. 12, lines 58-64;
Delete the following duplicative language from each of three locations, namely, claim 1, claim 4, and claim 11.

"said outer wall having a plurality of sections of adhesive ridges, and a plurality of relief valleys, wherein each section of adhesive ridges of said plurality of sections of adhesive ridges is separated from a next adjacent section of adhesive ridges of said plurality of sections of adhesive ridges by a relief valley of said plurality of relief valleys"

Col. 11, line 2;
Claim 1, delete the following duplicative language: "; said sweep wall having a curved portion;"

Signed and Sealed this
Ninth Day of August, 2011

David J. Kappos
*Director of the United States Patent and Trademark Office*